US012659044B2

(12) United States Patent (10) Patent No.: US 12,659,044 B2
Tang et al. (45) Date of Patent: Jun. 16, 2026

(54) SYSTEMS AND METHODS FOR IN-PHASE AND QUADRATURE MODULATION

(71) Applicant: HUAWEI TECHNOLOGIES CO., LTD., Shenzhen (CN)

(72) Inventors: Xuefeng Tang, Kanata (CA); Qiang Jin, Shenzhen (CN); Wing Chau Ng, Kanata (CA); Chuandong Li, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 18/618,399

(22) Filed: Mar. 27, 2024

(65) Prior Publication Data

US 2024/0243815 A1 Jul. 18, 2024

Related U.S. Application Data

(63) Continuation of application No. PCT/CN2021/122124, filed on Sep. 30, 2021.

(51) Int. Cl.
| | |
|---|---|
| *H04B 10/54* | (2013.01) |
| *H04B 10/50* | (2013.01) |
| *H04B 10/516* | (2013.01) |
| *H04L 27/36* | (2006.01) |

(52) U.S. Cl.
CPC ....... *H04B 10/541* (2013.01); *H04B 10/5055* (2013.01); *H04B 10/5165* (2013.01); *H04L 27/36* (2013.01)

(58) Field of Classification Search
CPC ........................ H04B 10/5055; H04B 10/5165
See application file for complete search history.

(56) References Cited

U.S. PATENT DOCUMENTS

| | | | | |
|---|---|---|---|---|
| 2010/0189443 A1* | 7/2010 | Krause | ................ | H04L 27/2627 |
| | | | | 398/115 |
| 2012/0224866 A1* | 9/2012 | Gaete | ..................... | H04B 10/27 |
| | | | | 398/186 |
| 2014/0341576 A1* | 11/2014 | Gaete | ..................... | H04B 10/27 |
| | | | | 398/58 |
| 2020/0081277 A1* | 3/2020 | Rohde | ................ | H04B 10/5053 |
| 2021/0367672 A1* | 11/2021 | Nazarathy | .......... | G02B 6/29302 |

* cited by examiner

*Primary Examiner* — Nathan M Cors
(74) *Attorney, Agent, or Firm* — BCF LLP

(57) ABSTRACT

Systems and methods for In-phase and Quadrature modulation. The method includes i) processing In-phase digital signals and Quadrature digital signals and generating PT modulated In-phase analog signals and PT modulated Quadrature analog signals, ii) receiving an optical signal, iii) modulating the optical signal in accordance with the PT modulated In-phase analog signals and the PT modulated Quadrature analog signals and generate PT modulated In-phase optical signals and PT modulated Quadrature optical signals, iv) biasing the PT modulated In-phase optical signals and the PT modulated Quadrature optical signals to a null point, v) adjusting a phase bias point of the PT modulated Quadrature optical signals and generating phase adjusted PT modulated Quadrature optical signals, and vi) combining the PT modulated In-phase optical signals and phase adjusted PT modulated Quadrature optical signal and generate a combined PT modulated optical signal to be transmitted towards a receiver.

22 Claims, 8 Drawing Sheets

152

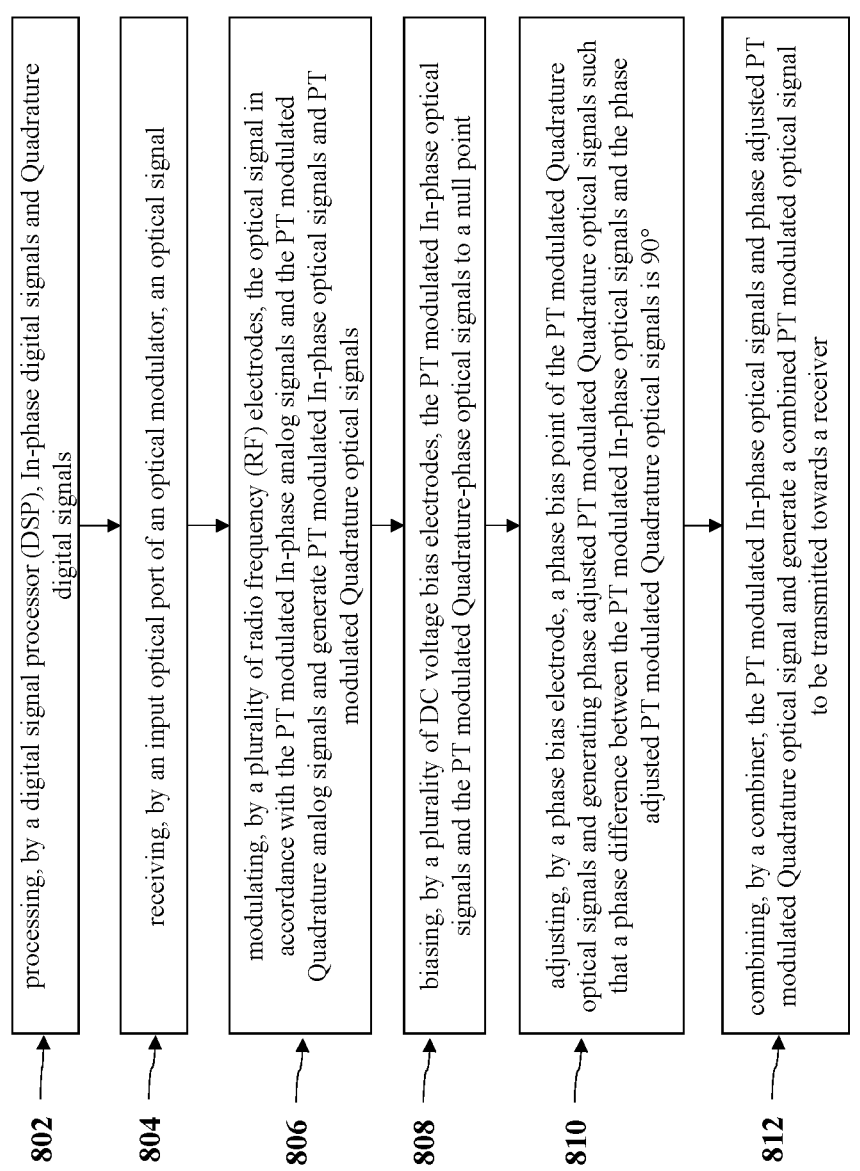

802 — processing, by a digital signal processor (DSP), In-phase digital signals and Quadrature digital signals 804 — receiving, by an input optical port of an optical modulator, an optical signal 806 — modulating, by a plurality of radio frequency (RF) electrodes, the optical signal in accordance with the PT modulated In-phase analog signals and the PT modulated Quadrature analog signals and generate PT modulated In-phase optical signals and PT modulated Quadrature optical signals 808 — biasing, by a plurality of DC voltage bias electrodes, the PT modulated In-phase optical signals and the PT modulated Quadrature-phase optical signals to a null point 810 — adjusting, by a phase bias electrode, a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°

812 — combining, by a combiner, the PT modulated In-phase optical signals and phase adjusted PT modulated Quadrature optical signal and generate a combined PT modulated optical signal to be transmitted towards a receiver

SYSTEMS AND METHODS FOR IN-PHASE AND QUADRATURE MODULATION

CROSS-REFERENCE TO RELATED APPLICATIONS

The present application is a continuation application of International Patent Application No. PCT/CN2021/122124, entitled "Systems and Methods for In-Phase and Quadrature Modulation," filed Sep. 30, 2021, the entirety of which is incorporated by reference herein.

TECHNICAL FIELD

The present disclosure generally relates to optical communications and, in particular, to a system and a method for In-phase and Quadrature modulation.

BACKGROUND

Typically, a Parallel Mach-Zehnder modulator (MZM) or In-phase and Quadrature MZM (IQ-MZM) is used to generate Quadrature-phase shift keying (QPSK) and quadrature amplitude modulation (QAM) signals for coherent optical transmission systems.

For proper modulation performance, maintaining a phase difference of $\pi/2$ between the In-phase and Quadrature data is required. To achieve this condition, a DC bias voltage for the outer MZM (i.e. phase bias) should be locked to a point in which the I and Q data are orthogonal in phase. A deviation from the $\pi/2$ phase bias point causes a phase error resulting in a degradation of the phase orthogonality for I and Q data channels.

Although the quadrature error (QE) may be mitigated to some extent by an IQ equalization within the receiver digital signal processing (DSP) module, the compensation performance of the IQ equalization is limited by channel impairments, such as amplified spontaneous emission (ASE) noise, state of polarization (SOP), etc. In addition, the bias drifting must be controlled to be within small range to secure the acquisition at the receiver.

Generally, a bias locking circuit is used at the transmitter side to lock the QE to a minimum value. Compared to individual bias locking for MZMs that generate I and Q data components, where it applies a first-order locking mechanism, the phase locking is normally based on a second-order locking mechanism. A dither signal is normally applied to the DC bias for I and Q MZMs, respectively, and the QE bias error signal is detected from the beat signal between I and Q dithers. The locking accuracy and error signal is then limited by the detection sensitivity of dither signal at the beating frequency. To increase the detection sensitivity and locking accuracy, a relatively strong dither signal is normally required. However, a strong dither signal perturb significantly the signal amplitude and may degrade the signal quality and degrade the transmission performance.

With this said, there is an interest in developing systems and methods for efficient phase bias control for an IQ modulator.

SUMMARY

The embodiments of the present disclosure have been developed based on developers' appreciation of the limitations associated with the prior art, namely efficiently maintaining a phase difference of 90° between the In-phase and Quadrature modulation components of the optical signal.

Developers of the present technology have devised systems and methods for In-phase and Quadrature modulation of the optical signal. In particular to determining a phase deviation between the In-phase and Quadrature modulation components of the optical signals and correcting the determined phase deviation. To do so, in various non-limiting embodiment, the data bearing In-phase and Quadrature digital signals are processed using pilot tones prior to modulating the optical signals.

In accordance with a first broad aspect of the present disclosure, there is provided In-phase and Quadrature (IQ) modulator system comprising: a digital signal processor (DSP) configured to process In-phase digital signals and Quadrature digital signals, in which the processing of the In-phase digital signals and the Quadrature digital signals includes: providing a first delay to at least one of the In-phase digital signals and the Quadrature digital signals; combining the In-phase digitals signals and the Quadrature digital signals to generate a complex digital signal; modulating upper side band (USB) frequency components of the complex digital signal by a first pilot-tone (PT) frequency signal and generating PT modulated time domain samples corresponding to the USB frequency components; modulating lower side band (LSB) frequency components of the complex digital signal by a second PT frequency signal and generating PT modulated time domain samples corresponding to the LSB frequency components; combining the PT modulated time domain samples corresponding to the USB frequency components and LSB frequency components and generating combined PT modulated time domain samples; splitting the combined PT modulated time domain samples into PT modulated In-phase digital signals and PT modulated Quadrature digital signals; wherein, if the In-phase digital signals were provided with the first delay, providing a second delay to the PT modulated In-phase digital signals and if the Quadrature digital signals were provided with the first delay, providing the second delay to the PT modulated Quadrature digital signals; and converting the PT modulated In-phase digital signals and the PT modulated Quadrature digital signals into corresponding PT modulated In-phase analog signals and PT modulated Quadrature analog signals; an optical modulator comprising: an input optical port configured to receive an optical signal; an arm coupled to the input optical port, the arm including: a plurality of radio frequency (RF) electrodes coupled to the DSP and configured to modulate the optical signal in accordance with the PT modulated In-phase analog signals and the PT modulated Quadrature analog signals and generate PT modulated In-phase optical signals and PT modulated Quadrature optical signals; a plurality of DC voltage bias electrodes configured to bias the PT modulated In-phase optical signals and the PT modulated Quadrature optical signals to a null point; a phase bias electrode configured to adjust a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°; and a combiner configured to combine the PT modulated In-phase optical signals and phase adjusted PT modulated Quadrature optical signals signal and generate a combined PT modulated optical signal to be transmitted towards a receiver.

In accordance with other embodiments of the present disclosure, the IQ modulator system further comprising an RF driver configured to amplify the PT modulated In-phase analog signals and PT modulated Quadrature-phase analog signal and provide the amplified PT modulated In-phase analog signals and the amplified PT modulated Quadrature analog signals to the plurality of RF electrodes.

In accordance with other embodiments of the present disclosure, the IQ modulator system, further comprising an IQ bias voltage controller configured to supply IQ bias voltages to the plurality of DC voltage bias electrodes.

In accordance with other embodiments of the present disclosure, the IQ modulator system further comprising a phase bias voltage controller configured to supply phase bias voltages to the phase bias electrode.

In accordance with other embodiments of the present disclosure, the IQ modulator system, wherein the first delay and the second delay are provided by at least one finite impulse response (FIR) filter.

In accordance with other embodiments of the present disclosure, the IQ modulator system, wherein the USB frequency components of the complex digital signals are amplitude modulated by the first PT frequency signal.

In accordance with other embodiments of the present disclosure, the IQ modulator system, wherein the LSB frequency components of the complex digital signals are amplitude modulated by the second PT frequency signal.

In accordance with other embodiments of the present disclosure, the IQ modulator system, wherein a summation of the first delay and the second delay is approximately equal to zero.

In accordance with other embodiments of the present disclosure, the IQ modulator system, further comprising a bias control unit configured to: detect the first PT frequency signal and the second PT frequency; generate an error signal based on the detected first PT frequency signal and the second PT frequency; and provide the error signal to the phase bias electrode.

In accordance with other embodiments of the present disclosure, the IQ modulator system, wherein the bias control unit comprises: a photo diode configured to convert a small power of the combined PT modulated optical signal into a corresponding electrical signal; a PT detector configured to detect the first PT frequency signal and the second PT frequency from the electrical signal; an amplitude difference calculator be configured to calculate a difference between the amplitudes of the first PT frequency signal and the second PT frequency represented as the error signal; and a feedback control loop configured to provide the error signal to the phase bias electrode.

In accordance with other embodiments of the present disclosure, the IQ modulator system, wherein the phase bias electrode configured to adjust the phase of the PT modulated Quadrature optical signal based on the error signal.

In accordance with a second broad aspect of the present disclosure, there is provided a method for In-phase and Quadrature (IQ) modulation comprising: processing, by a digital signal processor (DSP), In-phase digital signals and Quadrature digital signals, in which the processing of the In-phase digital signals and the Quadrature digital signals includes: providing a first delay to at least one of the In-phase digital signals and the Quadrature digital signals; combining the In-phase digitals signals and the Quadrature digital signals to generate a complex digital signal; modulating upper side band (USB) frequency components of the complex digital signal by a first pilot-tone (PT) frequency signal and generating PT modulated time domain samples corresponding to the USB frequency components; modulating lower side band (LSB) frequency components of the complex digital signal by a second PT frequency signal and generating PT modulated time domain samples corresponding to the LSB frequency components; combining the PT modulated time domain samples corresponding to the USB frequency components and LSB frequency components and generating combined PT modulated time domain samples; splitting the combined PT modulated time domain samples into PT modulated In-phase digital signals and PT modulated Quadrature digital signals; wherein, if the In-phase digital signals were provided with the first delay, providing a second delay to the PT modulated In-phase digital signals and if the Quadrature digital signals were provided with the first delay, providing the second delay to the PT modulated Quadrature digital signals; and converting the PT modulated In-phase digital signals and the PT modulated Quadrature digital signals into PT modulated In-phase analog signals and PT modulated Quadrature analog signals; receiving, by an input optical port of an optical modulator, an optical signal; modulating, by a plurality of radio frequency (RF) electrodes, the optical signal in accordance with the PT modulated In-phase analog signals and the PT modulated Quadrature analog signals and generate PT modulated In-phase optical signals and PT modulated Quadrature optical signals; biasing, by a plurality of DC voltage bias electrodes, the PT modulated In-phase optical signals and the PT modulated Quadrature optical signals to a null point; adjusting, by a phase bias electrode, a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°; and combining, by a combiner, the PT modulated In-phase optical signals and phase adjusted PT modulated Quadrature optical signal and generate a combined PT modulated optical signal to be transmitted towards a receiver.

In accordance with other embodiments of the present disclosure, the method, further comprising amplifying, by an RF driver, the PT modulated In-phase analog signals and PT modulated Quadrature analog signal and provide the amplified PT modulated In-phase analog signals and the amplified PT modulated Quadrature analog signal to the plurality of RF electrodes.

In accordance with other embodiments of the present disclosure, the method, further comprising supplying, by an IQ bias voltage controller, IQ bias voltages to the plurality of DC voltage bias electrodes.

In accordance with other embodiments of the present disclosure, the method, further comprising supplying, by a phase bias voltage controller, phase bias voltages to the phase bias electrode.

In accordance with other embodiments of the present disclosure, the method, wherein the first delay and the second delay are provided by at least one finite impulse response (FIR) filter.

In accordance with other embodiments of the present disclosure, the method, wherein the USB frequency components of the complex digital signals are amplitude modulated by the first PT frequency signal.

In accordance with other embodiments of the present disclosure, the method, wherein LSB frequency components of the complex digital by the second PT frequency signal.

In accordance with other embodiments of the present disclosure, the method, wherein a summation of the first delay and the second delay is approximately equal to zero.

In accordance with other embodiments of the present disclosure, the method, further including detecting, by a bias control unit, the first PT frequency signal and the second PT frequency; generating, by the bias control unit, an error signal based on the detected first PT frequency signal and the second PT frequency; and providing, by the bias control unit, the error signal to the phase bias electrode In accordance with other embodiments of the present disclosure, the method, further comprising: converting, by a photo diode, a small power of the combined PT modulated optical signal into a corresponding electrical signal; detecting, by a PT detector, the first PT frequency signal and the second PT frequency from the electrical signal; calculating, by an amplitude difference calculator, a difference between the amplitudes of the first PT frequency signal and the second PT frequency represented as the error signal; and providing, by a feedback control loop, the error signal to the phase bias electrode.

In accordance with other embodiments of the present disclosure, the method, wherein adjusting, by the phase bias electrode, the phase of the PT modulated Quadrature optical signal is based on the error signal.

BRIEF DESCRIPTION OF THE FIGURES

Further features and advantages of the present disclosure will become apparent from the following detailed description, taken in combination with the appended drawings, in which:

FIG. 8 depicts a flowchart of a process representing a method for IQ modulation, in accordance with various non-limiting embodiments of the present disclosure.

Figure 1:
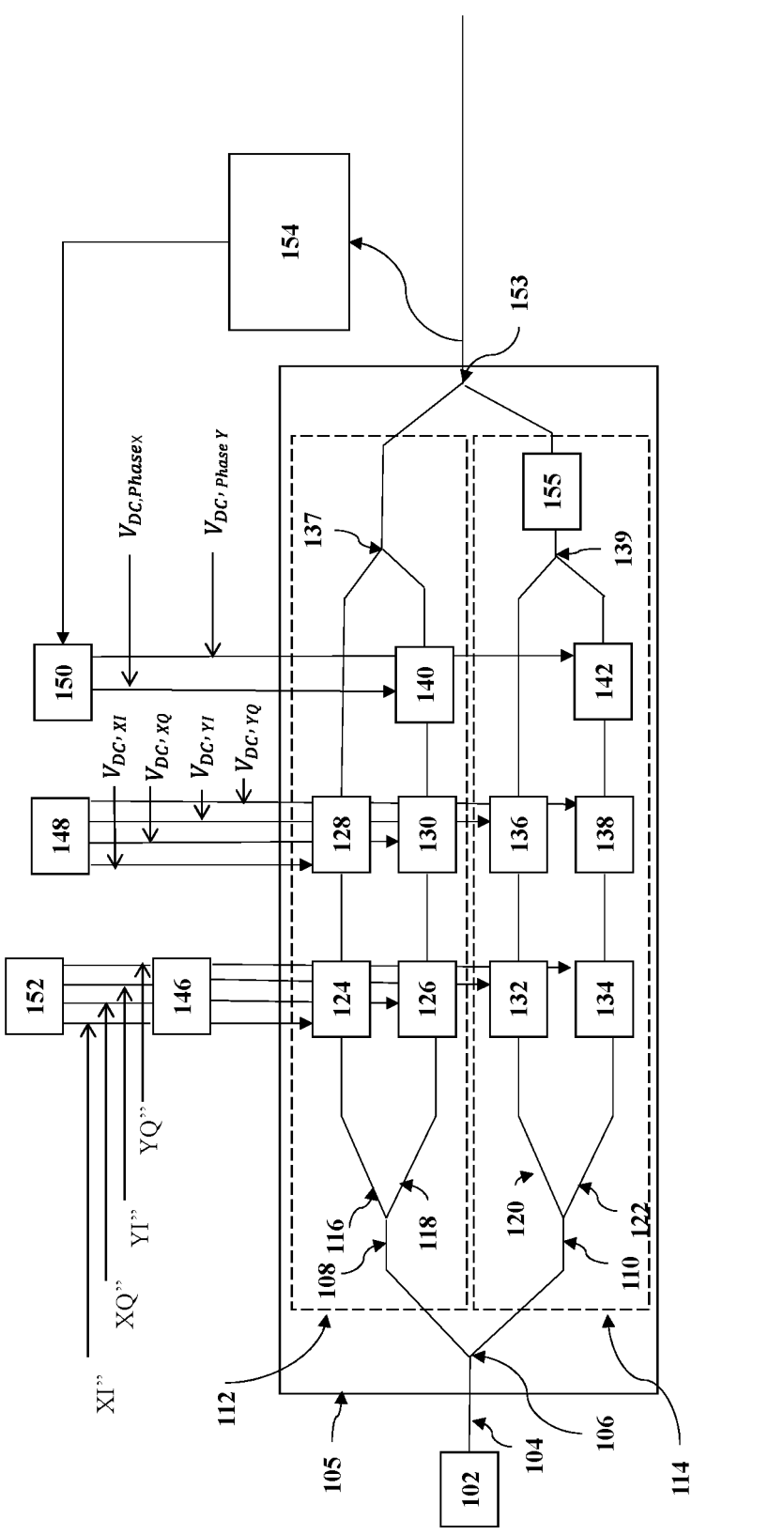
FIG. 1 illustrates an In-phase and Quadrature (IQ) modulator configured to modulate IQ digital signals over optical signals, in accordance with various non-limiting embodiments of present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for In-phase and Quadrature (IQ) modulation.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for IQ modulation.

The present disclosure discloses an accurate approach for precise phase bias control for an IQ modulator. The techniques disclosed in the present disclosure may be based on a first-order pilot-tone (PT) detection approach for phase bias control, which reduces a risk of burst errors caused by relatively strong dither strength for 2nd-order locking mechanism.

During optical communication, an optical signal may be modulated by In-phase and Quadrature data signals resulting in In-phase and Quadrature modulated optical signals. For an efficient communication a phase quadrature (i.e., 90° phase difference) should be maintained between the In-phase and Quadrature modulation components of the optical signal. Various embodiments of the present disclosure are directed towards determining a phase deviation between the In-phase and Quadrature modulation components of the optical signals and correcting the determined phase deviation. To do so, in various non-limiting embodiment, the data bearing In-phase and Quadrature digital signals are processed prior to modulating the optical signals.

During processing, in certain non-limiting embodiments of the present disclosure, with a digital signal processor, an amplitude modulated PT at different frequencies may be applied to the lower side band frequency components and the upper side band frequency components of the complex digital signal bearing In-phase digital signals and the Quadrature digital signals. The dual-band PT modulated digital signal may be converted to dual-band PT modulated analog signals via digital-to-analog converting. The dual-band modulated analog signal may be used to modulate the optical signals and generating dual-band PT modulated optical signals.

A quadrature error (QE) i.e., a deviation in phase orthogonality between In-phase and Quadrature digital signals may be determined by detecting the amplitude ratio between two PTs applied to the lower side band frequency components and the upper side band frequency components of the complex digital signal Further, a pair of fractional delay filters, for example a finite impulse response (FIR) filter, may be employed to introduce a relative IQ delay such that the amplitude difference between the two PTs may be amplified. In so doing, a good detection sensitivity of the amplitude tone difference may be used as QE signal to lock the phase bias point.

Therefore, a first-order locking system and method for IQ modulation may be achieved with a reduced system complexity.

FIG. 1 illustrates an IQ modulator system 100 configured to generate and modulate In-phase and Quadrature digital signals over an optical light source, in accordance with various non-limiting embodiments of present disclosure. As shown, the IQ modulator system 100 may include a light source 102. In certain non-limiting embodiments, the light source 102 may be configured to generate optical signals. The generated optical signals may be, for example, coherent optical light waves also referred to as optical carriers. In various non-limiting embodiments, the light source 102 may be a fixed wavelength or a tunable wavelength light source such as a laser or a light-emitting diode without limiting the scope of present disclosure.

The light source 102 may be coupled to an input optical port 104 of a dual-polarization IQ (DP-IQ) modulator 105. The input optical port 104 may be configured to receive the optical signal from the light source 102. In certain non-limiting embodiments, an optical splitter 106 may be configured to split the optical signal at the input optical port 104 of DP-IQ modulator 105 into two operational arms, a first arm 108 and a second arm 110, corresponding to X and Y polarization directions, respectively. The first arm 108 may include a first IQ modulator 112 and the second arm 110 may include a second IQ modulator 114. The first IQ modulator 112 may, in turn, include two Mach-Zehnder modulators (MZMs) at two arms 116 and 118 and the second IQ modulator 114 may also, in turn, include two MZMs at two arms 120 and 122.

The first IQ modulator 112 may include a plurality of first radio frequency (RF) electrodes 124 and 126, one for each arm 116 and 118 respectively. Further, the first IQ modulator 112 may also include a plurality of first DC voltage bias electrodes 128 and 130, one for each arm 116 and 118 respectively.

In certain non-limiting embodiments, the plurality of first RF electrodes 124, 126, and the plurality of second RF electrodes 132, and 134 may be coupled to a digital signal processor (DSP) 152 via a RF driver 146. The DSP 152 may be configured to process the digital signals XI, XQ, YI, and YQ. In certain non-limiting embodiments, the digital data signal XI, XQ, YI, and YQ may represent In-phase and Quadrature digital signals at X and Y polarization directions. The DSP 152 may be configured to process the digital data signals XI, XQ, YI, and YQ and generate PT modulated digital signals XI', XQ', YI', and YQ' (details about processing will be discussed later in the disclosure). The DSP 152 may convert the PT modulated digital signals XI', XQ', YI', and YQ' to PT modulated analog signals XI", XQ", YI", and YQ" via a digital-to-analog convertor and forward them to the RF driver 146.

The RF driver 146 may be configured to amplify the PT modulated analog signals XI", XQ", YI", and YQ" and supply the amplified PT modulated analog signals XI", XQ", YI", and YQ" to the plurality of first RF electrodes 124, 126, and the plurality of second RF electrodes 132, and 134 respectively. By way of an example, XI", the amplified PT modulated analog signal for the In-phase channel at X polarization direction may be applied to the first RF electrode 124, and XQ", the amplified PT modulated signal for Quadrature channel at X polarization direction may be applied to the first RF electrode 126. The plurality of first RF electrodes 124 and 126 may impart a modulation phase on the optical signal passing through the first arm 108 based on the applied PT modulated analog signals XI" and XQ". In a similar manner, YI', the amplified PT modulated analog signal for in-phase channel at the Y polarization direction may be applied to the second RF electrode 132, and YQ', the amplified PT modulated analog signal for quadrature channel at Y polarization direction may be applied to the RF electrode 134. The plurality of second RF electrodes 132 and 134 may impart a modulation phase on the optical signal passing through the second arm 110 based on the applied PT modulated analog signals YI' and YQ'

In certain non-limiting embodiments, the plurality of first DC voltage bias electrodes 128, 130 and the plurality of second DC voltage bias electrodes 136, and 138 may be connected to an IQ bias voltage controller 148. The IQ bias voltage controller 148 may be configured to supply IQ bias voltages to the plurality of first DC voltage bias electrodes 128, 130 and the plurality of second DC voltage bias electrodes 136, and 138. By way of an example, a DC bias voltage $V_{DC,XI}$ may be applied to the first DC voltage bias electrode 128, a DC bias voltage $V_{DC,XQ}$ may be applied to the first DC voltage bias electrode 130, a DC bias voltage $V_{DC,YI}$ may be applied to the second DC voltage bias electrode 136, and a DC bias voltage $V_{DC,YQ}$ may be applied to the second DC voltage bias electrode 138. In certain non-limiting embodiments, the DC bias voltages $V_{DC,XI}$ and $V_{DC,XQ}$, may be configured to bias child MZMs (e.g., the modulators in the arm 116 and 118) of the first IQ modulator 112. Similarly, the DC bias voltages $V_{DC,YI}$ and $V_{DC,YQ}$ may be configured to bias child MZMs (e.g., the modulators in the arm 120 and 122) of the second IQ modulator 114 at a minimum transmission point.

In certain non-limiting embodiments, the arm 118 and the arm 122 may further include a first phase bias electrode 140 and a second phase bias electrode 142 respectively connected to a phase bias voltage controller 150. The phase bias voltage controller 150 may be configured to supply phase bias voltages to the first phase bias electrode 140 and the second phase bias electrode 142. By way of an example, the phase bias voltage controller 150 may supply a DC bias voltage $V_{DC, Phase\ X}$ and a DC bias voltage $V_{DC, Phase\ Y}$ to the first phase bias electrode 140 and the second phase bias electrode 142 respectively to produce a phase bias for the optical signals in each arm 108, and 110.

In certain non-limiting embodiments, the DC bias voltage $V_{DC, Phase\ X}$ may be configured to bias the first IQ modulator at a quadrature point by generating a $\pi/2$ phase difference between the optical signals generated in the arm 116 and in the arm 118. In other words, the first phase bias electrode 140 may be configured to adjust a phase of the PT modulated Quadrature optical signal and may generate a phase adjusted PT modulated Quadrature optical signal such that a phase difference between the PT modulated In-phase optical signal in the arm 116 and the phase adjusted PT modulated Quadrature optical signal in the arm 118 is 90°.

In a similar manner, the DC bias voltage $V_{DC, Phase\ Y}$ may be configured to bias the second IQ modulator 114 to a quadrature point by generating a $\pi/2$ phase difference between the optical signals generated in the arm 120 and in the arm 122. In other words, the second phase bias electrode 142 may be configured to adjust a phase of the PT modulated Quadrature optical signal and may generate a phase adjusted PT modulated Quadrature optical signal such that a phase difference between the PT modulated In-phase optical signal in the arm 120 and the phase adjusted PT modulated Quadrature optical signal in the arm 120 is 90°.

In certain non-limiting embodiments, a combiner 137 may be configured to combine the PT modulated In-phase optical signal and phase adjusted PT modulated Quadrature optical signal in the arms 116 and 118 and generate a first combined PT modulated optical signal, for example a quadrature amplitude modulated (QAM) optical signal, to be transmitted towards a receiver. Also, a combiner 139 may be configured to combine the PT modulated In-phase optical signal and phase adjusted PT modulated Quadrature-phase optical signal in the arms 120 and 122 and generate a second combined optical signal, to be transmitted towards a receiver.

In certain non-limiting embodiments, the second arm 110 may further include a polarization rotator 155. The combiner 139 may supply the second combined PT modulated optical signal to the polarization rotator 155. The polarization rotator 155 may be configured to adjust the polarization direction of the second combined PT modulated optical signal in such a manner the optical signals from the combiner 137 and 139 are orthogonal to each other.

In certain non-limiting embodiments, a combiner 153 may be configured to combine the first combined PT modulated optical signal received from the combiner 137 and the second combined from the polarization rotator 155 to achieve polarization multiplexing and transmitting a PT modulated optical signal to be transmitted towards a receiver.

The IQ modulator system 100 may be used to implement multiple amplitude and phase-based modulation schemes. The particular modulation scheme may depend on the particular multi-level signal with certain peak-to-peak voltage applied to the first IQ modulator 112 and the second IQ modulator 114. In certain non-limiting embodiments, the first IQ modulator 112 and the second IQ modulator 114 may be nested Mach-Zehnder (MZ) type modulators. As such for a nested MZ type modulator, typically child Mach-Zehnder modulators are biased at the point of minimum transmission (null point) while parent Mach-Zehnder is biased at the quadrature point.

In various non-limiting embodiments, the RF driver 146, the IQ bias voltage controller 148, and/or the phase bias voltage controller 150 may be constructed from one or more electrical circuits. In various configurations, the circuits can comprise FPGAs, ASICS, DSPs, ADCs, digital-to-analog convertors (DACs) and/or other discrete components and/or circuits, alone or in combination.

Figure 2:
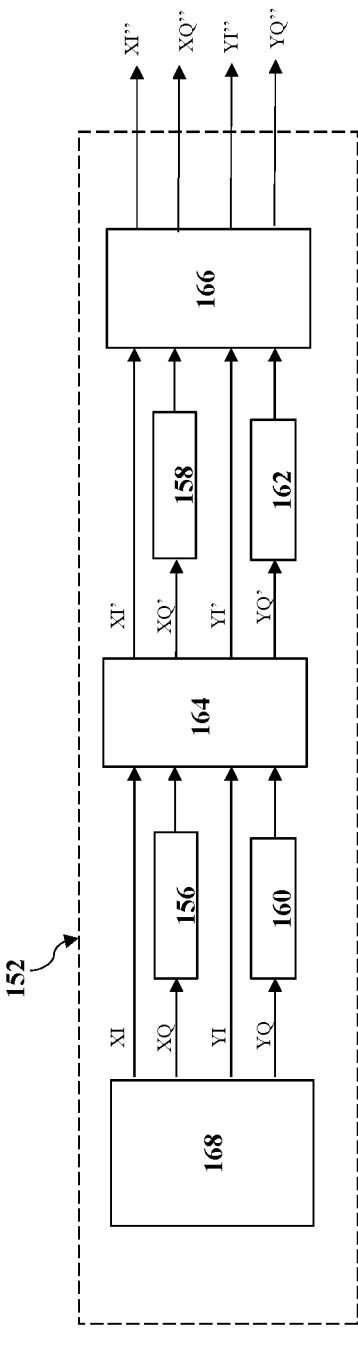
FIG. 2 illustrates a high-level functional block diagram of a digital signal processor configured to process digital signals XI, XQ, YI, and YQ, in accordance with various non-limiting embodiments of the present disclosure.

FIG. 2 illustrates a high-level functional block diagram of the DSP 152 configured to generate and process the digital signals XI, XQ, YI, and YQ, in accordance with various non-limiting embodiments of the present disclosure. As shown, the DSP 152 may include delay elements 156, 158, 160, and 162, a dual-band pilot-tone (PT) modulator 164, a DAC 166 and a forward error correction-based encoder and bit mapper 168. It is to be noted that the DSP 152 may include other components and modules. However, such components and modules have been omitted from FIG. 2 for the purpose of simplicity.

In certain non-limiting embodiments, the forward error correction-based encoder and bit mapper 168 may be configured to generate the digital signals XI, XQ, YI, and YQ. At least some of the digital signals XI, XQ, YI, and YQ may be provided with a first delay using delay 156 and 160. It is to be noted that in FIG. 2 only two delay elements 156 and 160 have been illustrated providing delays to the digital signals XQ and YQ. However, in various non-limiting embodiments, the number of delay elements operating over the digital signals XI, XQ, YI, and YQ may be more or less than two. By way of an example, the DSP 152 may include four delay elements configured to provide delay to each of the digital signals XI, XQ, YI, and YQ.

Figure 3:
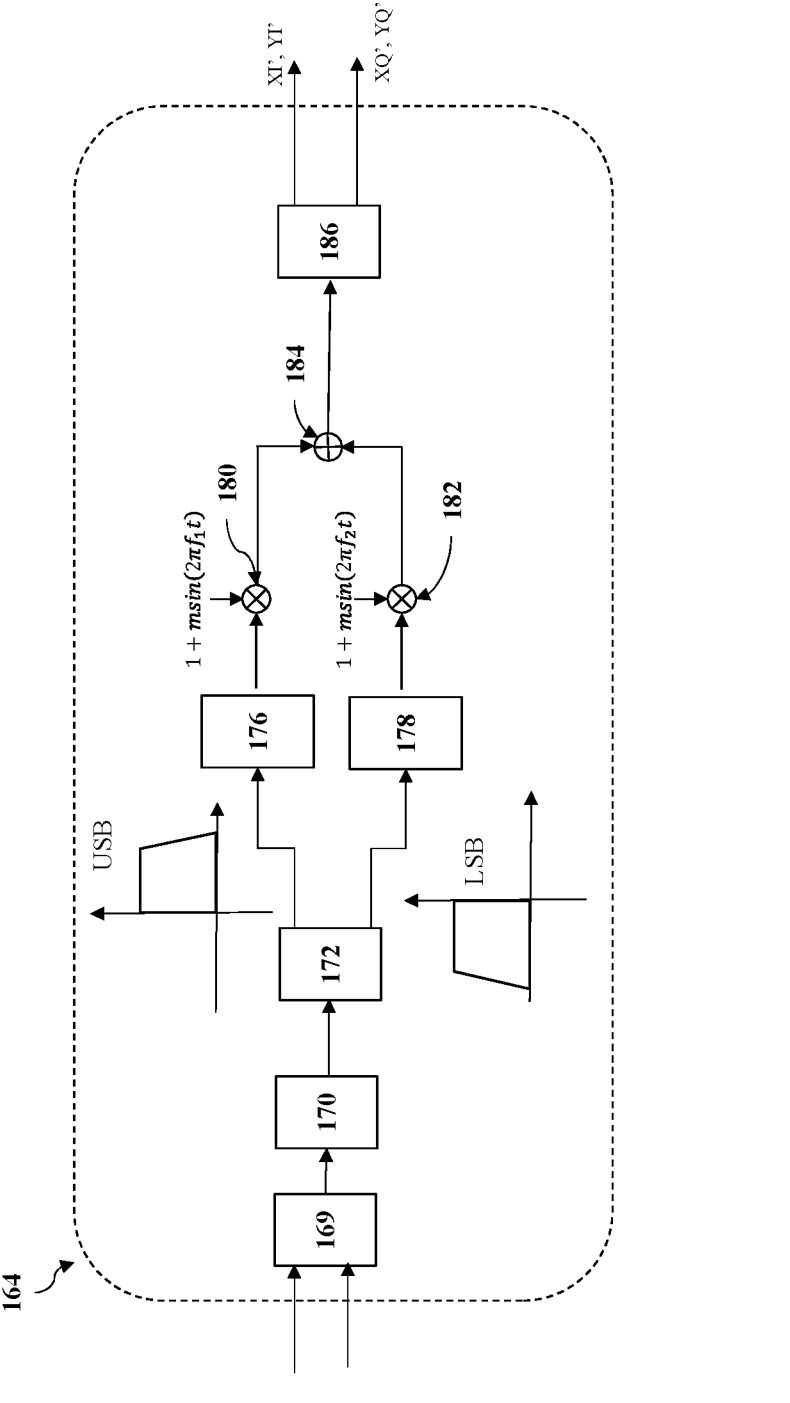
FIG. 3 illustrates a high-level functional block diagram of a dual-band PT modulator configured to modulate the delayed digital signals XI, XQ, YI, and YQ with the pilot tones, in accordance with various non-limiting embodiments of the present disclosure.

The dual-band PT modulator 164 may receive the delayed digital signals XI, XQ, YI, and YQ. FIG. 3 illustrates a high-level functional block diagram of the dual-band PT modulator 164 configured to modulate the delayed digital signals XI, XQ, YI, and YQ with the pilot tones, in accordance with various non-limiting embodiments of the present disclosure. As shown, the dual-band PT modulator 164 may include an IQ combiner 169, a Fast Fourier Transformation (FFT) module 170, a frequency splitter 172, inverse FFT (IFFT) modules 176 and 178, multipliers 180 and 182, an adder 184 and an IQ splitter 186. It is to be noted that the dual-band PT modulator 164 may include other components and modules but have been omitted from FIG. 3 for the purpose of simplicity.

The IQ combiner 169 may be configured to combine the In-phase and Quadrature digital signals and represent them as complex digital signals. By way of example, the IQ combiner 169 may receive delayed digital signals XI and XQ and combine them to generate a complex digital signal XI+jXQ. In a similar manner, the IQ combiner may receive delayed digital signals YI and YQ and combine them to generate a complex digital signal YI+jYQ.

It is to be noted the dual-band PT modulator 164 may be configured to process In-phase and Quadrature digital signals associated with one polarization (i.e., either X or Y polarization) at a time. In certain non-limiting embodiments, the DSP 152 may include additional PT modulator similar to the dual-band PT modulator 164 to process In-phase and Quadrature digital signals associated with two polarization (i.e., X and Y polarization) in parallel. Such configuration has been omitted from the FIG. 3 for the purpose of simplicity.

The FFT module 170 may be configured to convert the time domain delayed complex digital signals XI+jXQ, and YI+jYQ into frequency domain. The FFT module 170 may provide the frequency domain signals to the frequency splitter 172. The frequency splitter 172 may be configured to split the frequency-domain signals into upper side band (USB) frequency components and lower side band (LSB) frequency components. The USB frequency components may include frequency components that occupy frequencies greater than zero frequency (fc=0). The LSB frequency components may include frequency components that occupy frequencies less than zero frequency (fc=0).

The frequency splitter 172 may forward the USB frequency components to the IFFT module 176. The IFFT module 176 may be configured to convert the USB frequency components into the corresponding time domain samples. Similarly, the frequency splitter 172 may forward the LSB frequency components to the IFFT module 178. The IFFT module 178 may be configured to convert the LSB frequency components into the corresponding time domain samples. It is to be noted that two different IFFT modules 176 and 178 has been illustrated for the purpose of clarity of operations being performed. In various non-limiting embodiments, a single IFFT module may be used to convert the USB frequency components and the LSB frequency components into corresponding time domain samples.

The multiplier 180 may be configured to modulate an amplitude of the time domain samples corresponding to the USB frequency components of the complex digital signals XI+jXQ, and/or YI+jYQ by a PT signal 1+m cos(2πf₁t), where m is the modulation index and f₁ is the PT frequency applied to the USB frequency components.

The multiplier 182 may be configured to modulate an amplitude of the time domain samples corresponding to the LSB frequency components of the complex digital signals XI+jXQ, and/or YI+jYQ by a PT signal 1+m cos(2πf₂t), where m is the modulation index and f₂ is the PT frequency applied to the LSB frequency components.

It is to be noted that in various non-limiting embodiments, the dual-band PT modulator 164 may be configured to apply PT tone modulation to the USB and LSB spectral bands individually. In other words, the dual-band PT modulator 164 may perform a PT modulation one by one on signal components at each of USB and LSB bands. In other non-limiting embodiments, the DSP 152 may apply parallelly PT modulation to the USB and LSB bands.

Further, in some non-limiting embodiments, the USB and LSB frequency components of the complex digital signals XI+jXQ, and YI+jYQ may be modulated with the same PT frequency $f_1$. While, in other non-limiting embodiments, the USB frequency components of the complex digital signals XI+jXQand YI+jYQ may be modulated with the different PT frequencies. In a similar manner, in some of the non-limiting embodiments, the LSB frequency components of complex digital signals XI+jXQ and YI+jYQ may be modulated with the same PT frequency $f_2$. While, in other non-limiting embodiments, the LSB frequency components of complex modulated signals XI+jXQ, and YI+jYQ may be modulated with the different PT frequencies.

The adder 184 may be configured to combine the PT modulated time domain samples corresponding to the USB frequency components and the LSB frequency components. The adder 184 may provide the combined PT modulated time domain samples to the IQ splitter 186. The IQ splitter 184 may be configured to split the combined PT modulated time domain samples into PT modulated digital signals XI', XQ', YI', and YQ' corresponding to the digital signals XI, XQ, YI, and YQ.

Returning to FIG. 2, the delay elements 158 and 162 may adjust the delays in the PT modulated digital signals XI', XQ', YI', and YQ'. The delay elements may provide a second delay to the PT modulated digital signals XI', XQ', YI', and YQ'. In other words, the delay provided to the digital signals XI, XQ, YI, and YQ by the delay elements 156 and 160 may be compensated by the delay elements 158 and 162 such that the summation of the first delay and the second delay may be approximately equal to zero. It is to be noted that the delay elements 158 and 162 may operate in conjunction with the delay elements 156 and 160 such that only those signals are delay compensated by the delay elements 158 and 162, which were initially delayed by the delay elements 156 and 160.

Further, without departing from techniques discussed in the present disclosure, there may be more or less delay elements after the dual-band PT modulator 164 than disclosed, as during practical applications, it may depend on the number of delay elements present before the dual-band PT modulator. In certain non-limiting embodiments, the delay elements 156, 158, 160, and 162 may be based on finite impulse response filters.

The digital-to-analog convertor 166 may be configured to convert the delay adjusted PT modulated digital signals XI', XQ', YI', and YQ' to PT modulated analog signals XI", XQ", YI", and YQ". The DSP 152 may provide the PT modulated analog signals XI", XQ", YI", and YQ" to the RF driver 146. The RF driver 146 may amplify the PT modulated analog signals XI", XQ", YI", and YQ" and may provide the amplified PT modulated analog signals XI", XQ", YI", and YQ" to the plurality of first RF electrodes 124, 126, and the plurality of second RF electrodes 132, and 134 respectively.

The plurality of first RF electrodes 124 and 126 may be configured to modulate the optical signals in accordance with the amplified PT modulated analog signals XI", and XQ" and generate the corresponding PT modulated In-phase optical signals and PT modulated Quadrature optical signals. Further, the plurality of first DC voltage bias electrodes 128 and 130 may be configured to bias the child MZMs (e.g., the modulators in the arm 116 and 118) of first IQ modulator 112 at a null point. In other words, DC bias voltages applied to the plurality of first DC voltage bias electrodes 128 and 130 bias the power transmission of the child MZMs (e.g., the modulators in the arm 116 and 118) of the IQ modulator 112 at minimum.

In a similar manner, the plurality second RF electrodes 132 and 134 may be configured to modulate the optical signals in accordance with the amplified PT modulated analog signals YI", and YQ" and generate the corresponding PT modulated In-phase optical signals and PT modulated Quadrature optical signals. Further, the plurality of DC voltage bias electrodes 136 and 138 may be configured to bias the child MZMs (e.g., the modulators in the arm 120 and 122) of the second IQ modulator 114 at a null point.

Figure 4:
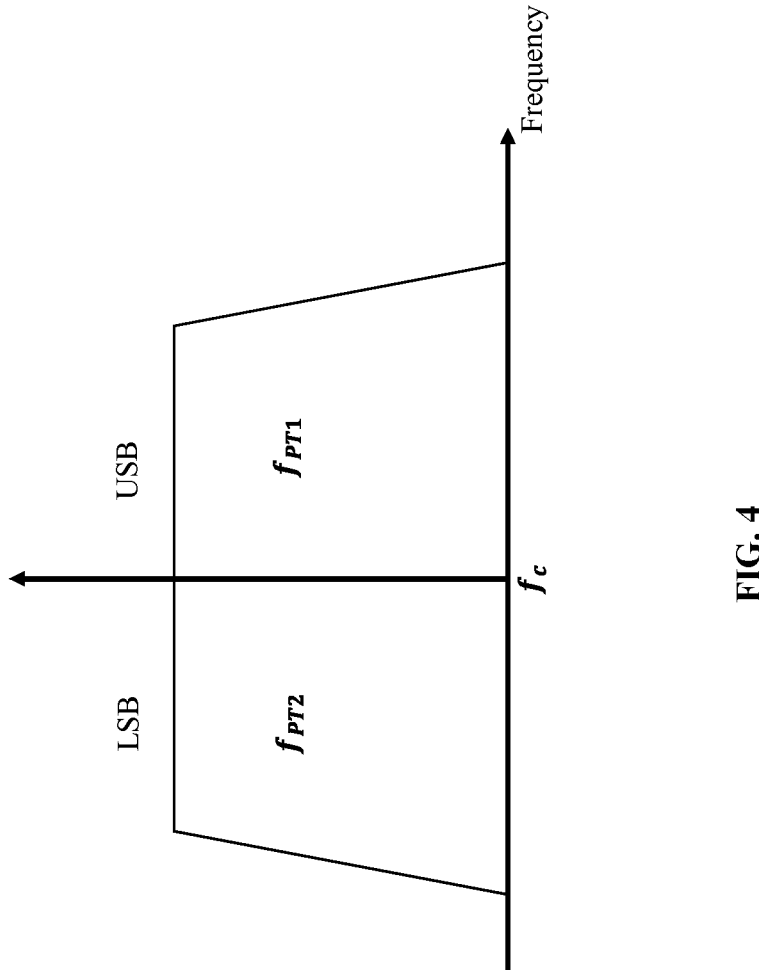
FIG. 4 illustrates dual-band spectrum with PT modulation of the signals XI, XQ, YI, and YQ with different frequencies, in accordance with various non-limiting embodiments of the present disclosure.

FIG. 4 illustrates dual-band spectrum with PT modulation of the complex digital signals XI+jXQ, YI+jYQ with different frequencies, in accordance with various non-limiting embodiments of the present disclosure. The PT with different frequencies (ranged from kHz to MHz) and the same small modulation index (typically 1% to 3%) may be applied to the USB frequency components and LSB frequency components. Whereas this example shows the pilot tones as sinusoidal signals, it will be appreciated that other signal forms may be used for the pilot tones, such as square waves. As an example, the optical field at X polarization (Y polarization direction is orthogonal to X polarization, the same principle applies signal at Y polarization) carrying the PT may be represented as:

$$E(t) = E_0(t) + m\cos(2\pi f_1) \cdot E_0^{USB}(t) + m\cos(2\pi f_2) \cdot E_0^{LSB}(t) \qquad (1)$$

Where, $E_0(t)$ is the optical field without PT modulation, $$E_0^{USB}$$

is the optical filed corresponding to USB components for $E_0$ with PT modulation, and $$E_0^{LSB}$$

(t) is the optical filed corresponding to LSB components for $E_0$ with PT modulation.

Returning to FIG. 1, the IQ modulator system 100 may include a bias control unit 154 configured to detect two PTs, generate error signals based on the detected PTs, and may provide those error signals as feedback to the first phase bias electrode 140 and to the second phase bias electrode 142 in order to lock the bias point at the quadrature (i.e., 90 degree phase rotation between I and Q data).

In certain non-limiting embodiments, a small portion power of the optical signal E(t) may be tapped into the bias control unit 154. The bias control unit 154 may be configured to detect the PTs and based on the detected PTs, the bias control unit 154 may generate the error signals.

Figure 5:
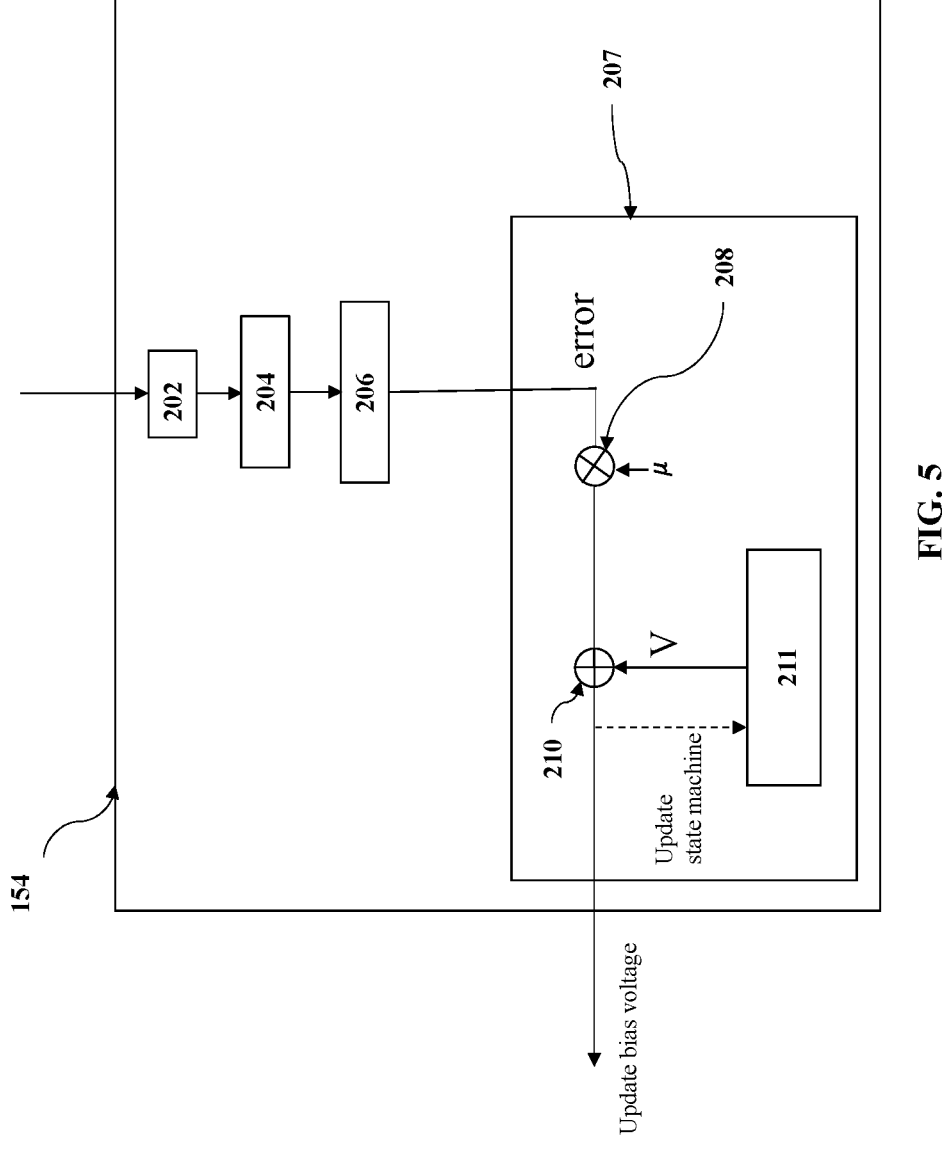
FIG. 5 illustrates a high-level functional block diagram of the bias control unit configured to generate an error signal based on the detected PTs, in accordance with various non-limiting embodiments of the present disclosure.

FIG. 5 illustrates a high-level functional block diagram of the bias control unit 154 configured to generate an error signal based on the detected PTs, in accordance with various non-limiting embodiments of the present disclosure. As shown, the bias control unit 154 may include a photo diode (PD) 202, a PT detector 204, an amplitude difference calculator 206, and a feedback control loop 207. It is to be noted that the bias control unit 154 may include other components and modules, however, such modules have been omitted from FIG. 5 for the purpose of simplicity.

The PD 202 may be configured to convert the small power of the PT modulated optical signal E(t) into a corresponding electrical signal. The PD 202 may be configured to supply the electrical signal to the PT detector 204. In certain non-limiting embodiments, the PT detector 204 may include a slow-speed transimpedance amplifier (TIA), and ADC, and a DSP. It is to be noted that for the purpose of simplicity, these components have been omitted from FIG. 5.

The PT detector 204 may be configured to detect the PTs imbedded in the optical signal E(t) from the electrical signal. In certain non-limiting embodiments, the PT detector 204 may convert the received electrical signal received from the PD 202 into the frequency domain using the FFT technique in digital domain. The PT detector 204 may be synchronized with the dual-band PT modulator 164 during the PT tone modulation process. In other words, the synchronization may be referred to as PT detector 204 may be aware of the PTs added by the dual-band PT modulator 164.

The amplitude of two PTs corresponding to the frequency $f_1$ and $f_2$ may be represented as:

$$A(PT_1) \propto m\{\langle |V_I(t)|^2 \rangle + \langle |V_q(t)|^2 \rangle + \sin(\delta)\langle V_I(t)H_I(t-\Delta\tau)\rangle + \quad (2)$$
$$\langle V_q(t)H_q(t-\Delta\tau)\rangle\}$$

$$A(PT_2) \propto m\{\langle |V_I(t)|^2 \rangle + \langle |V_q(t)|^2 \rangle - \sin(\delta)\langle V_I(t)H_I(t-\Delta\tau)\rangle + \quad (3)$$
$$\langle V_q(t)H_q(t-\Delta\tau)\rangle\}$$

where $V_I(t)$ and $V_q(t)$ represents in-phase and quadrature modulation components of the modulated optical signals and $H_I(t)$ and $H_q(t)$ are their corresponding Hilbert transform. $\delta$ is the phase error deviating from 90 degrees and $\Delta\tau$ being the timing skew applied by the delay elements 158 (for X polarization) and 162 (for Y polarization). Operator$\langle \ \rangle$ stands for averaging over time. It is to be noted that similar the PT detector 204 may compute similar amplitudes corresponding to the modulation signals YI and YQ.

Figure 6:
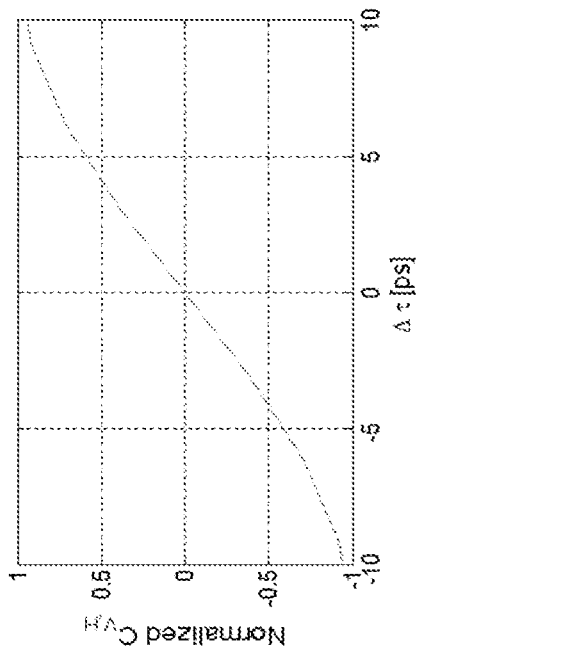
FIG. 6 illustrates simulation outcome corresponding to a PT detected by a PT detector, in accordance with various non-limiting embodiments of the present disclosure.

FIG. 6 illustrates simulation outcome corresponding to a PT detected by the PT detector 204, in accordance with various non-limiting embodiments of the present disclosure. As shown, the detected PT has an effective measurement sensitivity of around 25 dB SNR with an averaging time of 1.0 ms, where a bandwidth of the PD 202 was set at 60 MHz and the ADC associated with the ADC associated the PT detector 204 was set at sampling of 200 MS/s.

Returning to FIG. 5, the PT detector 204 may provide the PT amplitudes as represented by the equation (2) and (3) to the amplitude difference calculator 206. The amplitude difference calculator 206 may be configured to calculate a difference between the two amplitudes of the PTs. The difference may be represented as:

$$A(PT_1) - A(PT_2) = m\sin(\delta)(\langle V_I(t)H_I(t-\Delta\tau)\rangle + \langle V_q(t)H_q(t-\Delta\tau)\rangle) \quad (4)$$

Figure 7:
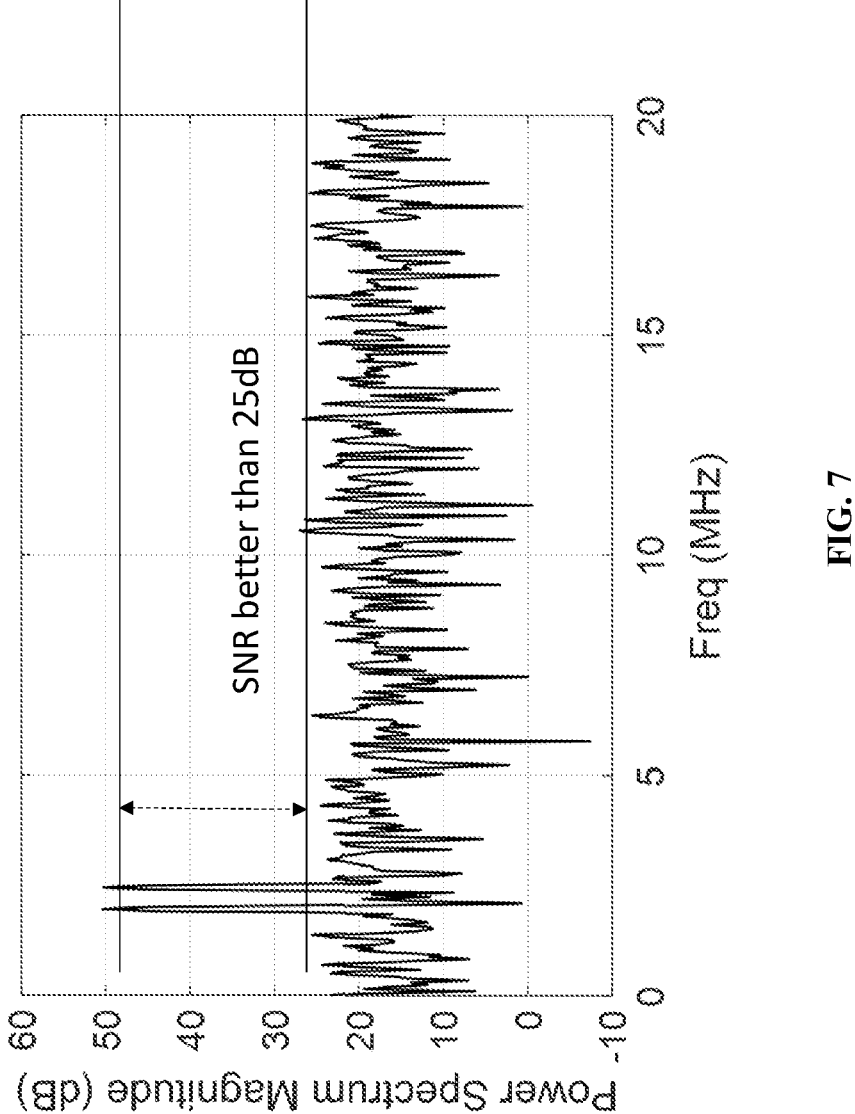
FIG. 7 illustrates a cross-correlation between a real field of a QPSK signal and its Hilbert transformation as a function of timing skew between I and Q signals, in accordance with various non-limiting embodiment of the present disclosure.

Equation (4) may represent an error signal representing a deviation from the quadrature-phase in the first arm 108 and a second arm 110. A cross-correlation between the optical electric fields $V_I \cdot V_q$ and their Hilbert transforms $H_I(t)$ and $H_q(t)$ have a strong dependence on the timing skew between them. To this end, in certain non-limiting embodiments, the DSP 152 may be configured to set a skew value around half baud duration such that the error signal may be amplified greatly to improve the error signal detection sensitivity as shown in FIG. 7 for a 65-Gbaud/s QPSK signal. FIG. 7 illustrates a cross-correlation between the real field of a QPSK signal and its Hilbert transformation for a PT modulated optical signal, in accordance with various non-limiting embodiment of the present disclosure. It is to be noted that, an imaginary field may have a similar characteristic to the real field as shown in the FIG. 7.

Going back to FIG. 5, in certain non-limiting embodiments, the feedback control loop 207 including a multiplier 208, an adder 210 and a state machine 211 may be configured to update the phase bias voltage based on the detected error signal. In particular, the multiplier 208 may multiply the error signal by u to adjust the loop gain. Further, a previous error signal stored in the state machine 211 may be added to the current error signal by the adder 210 to generate an updated bias voltage. This updated bias voltage may be stored in the state machine 211 and may be forwarded to the phase bias voltage controller.

As previously discussed, the dual-band PT modulator 164 may apply PT tones at different frequency to USB frequency components and the LSB frequency components, corresponding to the complex digital signals XI+jXQ, and YI+jYQ. In this example, the amplitudes for four PT (corresponding to four half spectral bands (LSB and USB) of the complex digital signals XI+jXQ, and YI+jYQ) may be detected at the same time by the bias control unit 154. The PT detector 204 receiving the optical signal from the transmitter may be required to be calibrated to compensate for the receiver frequency response ripple. The dual-band PT modulator 164 may be operated at a single frequency and the PT detector 204 may be configured to measure the PT power at a single frequency in order to cancel the measurement error caused by frequency response non-uniformity of the PD 202 and the associated TIA. A single pilot tone may be applied at the same frequency and same modulation index to the four half bands at alternating time periods. The pilot tone detection window of the PT detector 204 may be synchronized with the pilot tone generation timing of the pilot tone generator. The pilot tone amplitude for the four half bands may be determined by looping the four half bands.

Retuning to FIG. 1, the bias control unit 154 may be configured to provide the control signal in the form of voltages to the first phase bias electrode 140 and the second phase bias electrode 142 to compensate for any deviation from the quadrature of the optical signals in the first arm 108 and the second arm 110 based on the feed backed analog error signal.

It is to be noted that although the illustrated IQ modulator system 100 illustrates two arms 108 and 110 configured to modulate X polarized data bearing signals and Y polarized data bearing signals. However, in various non-limiting embodiments, the IQ modulator system 100 may include one arm configured to modulate data bearing digital signals either in X polarization or Y polarization without departing from the techniques disclosed in the present disclosure.

Thus, by virtue of the signal processing performed by the DSP 152 and the error signal detection by the bias control unit 154 an effective phase locking may be achieved. Moreover, as seen by equation (4), the phase locking may be achieved by first-order error signal, therefore the hardware requirements may be simple as compared to conventional phase locking techniques where the locking mechanism is based on second-order error signals.

FIG. 8 depicts a flowchart of a process 800 representing a method for IQ modulation, in accordance with various non-limiting embodiments of the present disclosure. As shown the process 800 commences at step 802 where a digital signal processor (DSP) processes In-phase digital signals and Quadrature digital signals.

As previously discussed, the DSP 152 may be configured to process the digital signals XI, XQ, YI, and YQ. In certain non-limiting embodiments, the digital data signal XI, XQ, YI, and YQ may represent In-phase and Quadrature digital signals at X and Y polarization directions. The DSP 152 may be configured to process the digital data signals XI, XQ, YI, and YQ and generate PT modulated In-phase digital signals XI', YI', and PT modulated Quadrature digital signals XQ', and YQ'. The DSP 152 may convert the PT modulated In-phase and Quadrature digital signals XI', XQ', YI', and YQ' to PT modulated In-phase analog signals XI", and YI" and PT modulated Quadrature analog signals XQ", and YQ". It is to be noted that although the above stated discussion is about digital signals in X and Y polarization, however, in various non-limiting embodiments of the present disclosure, the IQ modulator system including the DSP 152 may be configured to process digital signals either in X polarization or Y polarization without departing from the techniques disclosed in the present disclosure.

The process 800 proceeds to step 804, where an input optical port of an optical modulator receives an optical signal. As previously noted, the input optical port 104 may be configured to receive the optical signal from the light source 102.

The process 800 advances to step 806, where a plurality of radio frequency (RF) electrodes modulate the optical signal in accordance with the PT modulated In-phase analog signals and the PT modulated Quadrature analog signals and generate PT modulated In-phase optical signals and PT modulated Quadrature-phase optical signals.

As discussed previously, the plurality of first RF electrodes 124 and 126 may be configured to modulate the optical signals in accordance with the amplified PT modulated analog signals XI", and XQ" and generate the corresponding PT modulated In-phase optical signals and PT modulated Quadrature optical signals. In a similar manner, the plurality second RF electrodes 132 and 134 may be configured to modulate the optical signals in accordance with the amplified PT modulated analog signals YI", and YQ" and generate the corresponding PT modulated In-phase optical signals and PT modulated Quadrature optical signals.

The process 800 advances to step 808 where a plurality of DC voltage bias electrodes modulate the PT modulated In-phase optical signals and PT modulated Quadrature optical signals to a null point.

As noted previously, the plurality of first DC voltage bias electrodes 128 and 130 may be configured to bias the child MZMs (e.g., the modulators in the arm 116 and 118) of first IQ modulator 112 at a null point. In other words, DC bias voltages applied to the plurality of first DC voltage bias electrodes 128 and 130 bias the power transmission of the child MZMs (e.g., the modulators in the arm 116 and 118) of the IQ modulator 112 at minimum. In a similar manner, the plurality of DC voltage bias electrodes 136 and 138 may be configured to bias the child MZMs (e.g., the modulators in the arm 120 and 122) of the second IQ modulator 114 at a null point.

The process 800 moves to step 810, where a phase bias electrode adjusts a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°.

As discussed previously, the first phase bias electrode 140 may be configured to adjust a phase of the PT modulated Quadrature optical signal and may generate a phase adjusted PT modulated Quadrature optical signal such that a phase difference between the PT modulated In-phase optical signal in the arm 116 and the phase adjusted PT modulated Quadrature optical signal in the arm 118 is 90°. In a similar manner, the second phase bias electrode 142 may be configured to adjust a phase of the PT modulated Quadrature optical signal and may generate a phase adjusted PT modulated Quadrature optical signal such that a phase difference between the PT modulated In-phase optical signal in the arm 120 and the phase adjusted PT modulated Quadrature optical signal in the arm 120 is 90°.

The process 800 advances to step 812, where a combiner combines the PT modulated In-phase optical signals and phase adjusted PT modulated Quadrature optical signal and generate a combined PT modulated optical signal to be transmitted towards a receiver.

As previously noted, the combiner 137 may be configured to combine the PT modulated In-phase optical signal and phase adjusted PT modulated Quadrature optical signal in the arms 116 and 118 and generate a first combined PT modulated optical signal, for example a quadrature amplitude modulated (QAM) optical signal, to be transmitted towards a receiver. Also, the combiner 139 may be configured to combine the PT modulated In-phase optical signal and phase adjusted PT modulated Quadrature-phase optical signal in the arms 120 and 122 and generate a second combined optical signal to be transmitted towards a receiver.

It is to be understood that the operations and functionality of the IQ modulator system 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An In-phase and Quadrature (IQ) modulator system comprising:

a digital signal processor (DSP) configured to process In-phase digital signals and Quadrature digital signals, in which the processing of the In-phase digital signals and the Quadrature digital signals includes:

providing a first delay to at least one of the In-phase digital signals and the Quadrature digital signals;

combining the In-phase digital signals and the Quadrature digital signals to generate a complex digital signal;

modulating upper side band (USB) frequency components of the complex digital signal by a first pilot-tone (PT) frequency signal and generating PT modulated time domain samples corresponding to the USB frequency components;

modulating lower side band (LSB) frequency components of the complex digital signal by a second PT frequency signal and generating PT modulated time domain samples corresponding to the LSB frequency components;

combining the PT modulated time domain samples corresponding to the USB frequency components and LSB frequency components and generating combined PT modulated time domain samples;

splitting the combined PT modulated time domain samples into PT modulated In-phase digital signals and PT modulated Quadrature digital signals;

wherein, if the In-phase digital signals were provided with the first delay, providing a second delay to the PT modulated In-phase digital signals and if the Quadrature digital signals were provided with the first delay, providing the second delay to the PT modulated Quadrature digital signals; and converting the PT modulated In-phase digital signals and the PT modulated Quadrature digital signals into corresponding PT modulated In-phase analog signals and PT modulated Quadrature analog signals;

an optical modulator comprising:

an input optical port configured to receive an optical signal;

an arm coupled to the input optical port, the arm including:

a plurality of radio frequency (RF) electrodes coupled to the DSP and configured to modulate the optical signal in accordance with the PT modulated In-phase analog signals and the PT modulated Quadrature analog signals and generate PT modulated In-phase optical signals and PT modulated Quadrature optical signals;

a plurality of DC voltage bias electrodes configured to bias the PT modulated In-phase optical signals and the PT modulated Quadrature optical signals to a null point;

a phase bias electrode configured to adjust a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°; and a combiner configured to combine the PT modulated In-phase optical signals and phase adjusted PT modulated Quadrature optical signals signal and generate a combined PT modulated optical signal to be transmitted towards a receiver.

2. The IQ modulator system of claim 1, further comprising an RF driver configured to amplify the PT modulated In-phase analog signals and PT modulated Quadrature-phase analog signal and provide the amplified PT modulated In-phase analog signals and the amplified PT modulated Quadrature analog signals to the plurality of RF electrodes.

3. The IQ modulator system of claim 1, further comprising an IQ bias voltage controller configured to supply IQ bias voltages to the plurality of DC voltage bias electrodes.

4. The IQ modulator system of claim 1, further comprising a phase bias voltage controller configured to supply phase bias voltages to the phase bias electrode.

5. The IQ modulator system of claim 1, wherein the first delay and the second delay are provided by at least one finite impulse response (FIR) filter.

6. The IQ modulator system of claim 1, wherein the USB frequency components of the complex digital signals are amplitude modulated by the first PT frequency signal.

7. The IQ modulator system of claim 1, wherein the LSB frequency components of the complex digital signals are amplitude modulated by the second PT frequency signal.

8. The IQ modulator system of claim 1, wherein a summation of the first delay and the second delay is approximately equal to zero.

9. The IQ modulator system of claim 1, further comprising a bias control unit configured to:

detect the first PT frequency signal and the second PT frequency signal;

generate an error signal based on the detected first PT frequency signal and the second PT frequency signal; and provide the error signal to the phase bias electrode.

10. The IQ modulator system of claim 9, wherein the bias control unit comprises:

a photo diode configured to convert a small power of the combined PT modulated optical signal into a corresponding electrical signal;

a PT detector configured to detect the first PT frequency signal and the second PT frequency signal from the electrical signal;

an amplitude difference calculator be configured to calculate a difference between the amplitudes of the first PT frequency signal and the second PT frequency signal represented as the error signal; and a feedback control loop configured to provide the error signal to the phase bias electrode.

11. The IQ modulator system of claim 9, wherein the phase bias electrode is configured to adjust the phase of the PT modulated Quadrature optical signal based on the error signal.

12. A method for In-phase and Quadrature (IQ) modulation comprising:

processing, by a digital signal processor (DSP), In-phase digital signals and Quadrature digital signals, in which the processing of the In-phase digital signals and the Quadrature digital signals includes:

providing a first delay to at least one of the In-phase digital signals and the Quadrature digital signals;

combining the In-phase digital signals and the Quadrature digital signals to generate a complex digital signal;

modulating upper side band (USB) frequency components of the complex digital signal by a first pilot-tone (PT) frequency signal and generating PT modulated time domain samples corresponding to the USB frequency components;

modulating lower side band (LSB) frequency components of the complex digital signal by a second PT frequency signal and generating PT modulated time domain samples corresponding to the LSB frequency components;

combining the PT modulated time domain samples corresponding to the USB frequency components and LSB frequency components and generating combined PT modulated time domain samples;

splitting the combined PT modulated time domain samples into PT modulated In-phase digital signals and PT modulated Quadrature digital signals;

wherein, if the In-phase digital signals were provided with the first delay, providing a second delay to the PT modulated In-phase digital signals and if the Quadrature digital signals were provided with the first delay, providing the second delay to the PT modulated Quadrature digital signals; and converting the PT modulated In-phase digital signals and the PT modulated Quadrature digital signals into PT modulated In-phase analog signals and PT modulated Quadrature analog signals;

receiving, by an input optical port of an optical modulator, an optical signal;

modulating, by a plurality of radio frequency (RF) electrodes, the optical signal in accordance with the PT modulated In-phase analog signals and the PT modulated Quadrature analog signals and generate PT modulated In-phase optical signals and PT modulated Quadrature optical signals;

biasing, by a plurality of DC voltage bias electrodes, the PT modulated In-phase optical signals and the PT modulated Quadrature optical signals to a null point;

adjusting, by a phase bias electrode, a phase bias point of the PT modulated Quadrature optical signals and generating phase adjusted PT modulated Quadrature optical signals such that a phase difference between the PT modulated In-phase optical signals and the phase adjusted PT modulated Quadrature optical signals is 90°; and combining, by a combiner, the PT modulated In-phase optical signals and phase adjusted PT modulated Quadrature optical signals and generate a combined PT modulated optical signal to be transmitted towards a receiver.

13. The method of claim 12, further comprising amplifying, by an RF driver, the PT modulated In-phase analog signals and PT modulated Quadrature analog signals and provide the amplified PT modulated In-phase analog signals and the amplified PT modulated Quadrature analog signals to the plurality of RF electrodes.

14. The method of claim 12, further comprising supplying, by an IQ bias voltage controller, IQ bias voltages to the plurality of DC voltage bias electrodes.

15. The method of claim 12, further comprising supplying, by a phase bias voltage controller, phase bias voltages to the phase bias electrode.

16. The method of claim 12, wherein the first delay and the second delay are provided by at least one finite impulse response (FIR) filter.

17. The method of claim 12, wherein the USB frequency components of the complex digital signals are amplitude modulated by the first PT frequency signal.

18. The method of claim 12, wherein LSB frequency components of the complex digital signals are amplitude modulated by the second PT frequency signal.

19. The method of claim 12, wherein a summation of the first delay and the second delay is approximately equal to zero.

20. The method of claim 12, further comprising:

detecting, by a bias control unit, the first PT frequency signal and the second PT frequency signal;

generating, by the bias control unit, an error signal based on the detected first PT frequency signal and the second PT frequency signal; and providing, by the bias control unit, the error signal to the phase bias electrode.

21. The method of claim 20, further comprising:

converting, by a photo diode, a small power of the combined PT modulated optical signal into a corresponding electrical signal;

detecting, by a PT detector, the first PT frequency signal and the second PT frequency signal from the electrical signal;

calculating, by an amplitude difference calculator, a difference between the amplitudes of the first PT frequency signal and the second PT frequency signal represented as the error signal; and providing, by a feedback control loop, the error signal to the phase bias electrode.

22. The method of claim 20, wherein adjusting, by the phase bias electrode, the phase of the PT modulated Quadrature optical signal is based on the error signal.

* * * * *